(12) United States Patent
Cruz Serrano

(10) Patent No.: US 8,287,929 B2
(45) Date of Patent: Oct. 16, 2012

(54) PROTEIN GELATINOUS FOOD AND ITS MANUFACTURE PROCESS

(76) Inventor: Jośe Antonio Cruz Serrano, El Salto (MX)

( * ) Notice: Subject to any disclaimer, the term of this patent is extended or adjusted under 35 U.S.C. 154(b) by 1006 days.

(21) Appl. No.: 11/991,844

(22) PCT Filed: May 26, 2006

(86) PCT No.: PCT/MX2006/000041
§ 371 (c)(1),
(2), (4) Date: Mar. 12, 2008

(87) PCT Pub. No.: WO2007/139367
PCT Pub. Date: Dec. 6, 2007

(65) Prior Publication Data
US 2010/0159073 A1    Jun. 24, 2010

(51) Int. Cl.
*A23L 1/00*    (2006.01)

(52) U.S. Cl. .......................................... 426/61; 426/573

(58) Field of Classification Search .................... 426/61, 426/519, 573
See application file for complete search history.

(56) References Cited

U.S. PATENT DOCUMENTS

| | | | |
|---|---|---|---|
| 4,935,225 A * | 6/1990 | Curtis et al. | 424/58 |
| 6,706,256 B2 * | 3/2004 | Lawlor | 424/58 |
| 2003/0165607 A1 * | 9/2003 | Sipila | 426/601 |
| 2004/0057981 A1 * | 3/2004 | Base et al. | 424/439 |

OTHER PUBLICATIONS

Lees et al, Sugar Confectionery and Chocolate Manufacture, Leonard Hill Books, 1973 Edition, pp. 240-251 and 260-263.*
Little Brown and Company, The candy Cook Book, Norwood press, 1917, pp. 156-159.*
Smith, Jim; Hong-Shum, Lily (2003). Food Additives Data Book. ( pp. 126-128). Blackwell Publishing. Online version available at: http://www.knovel.com/web/portal/browse/display?_EXT_KNOVEL_DISPLAY_bookid=1381&VerticalID=0.*

* cited by examiner

*Primary Examiner* — Jyoti Chawla
(74) *Attorney, Agent, or Firm* — The Nath Law Group; Tanya E. Harkins

(57) ABSTRACT

Galatinous protein foodstuff and process for its preparation, comprising water, cane sugar, glucose, a protein element, xanthan gum, linseed fibre, vitamins, citrus seed extract, citric acid, malic acid, bifidus and lactobacilli, coloring agent and essence. This product improves human digestion and maximized utilization of the ingested foodstuff. It permits the restoration of the intestinal flora, improves digestive function and activates the immune system when ingested regularly and continuously.

3 Claims, 1 Drawing Sheet

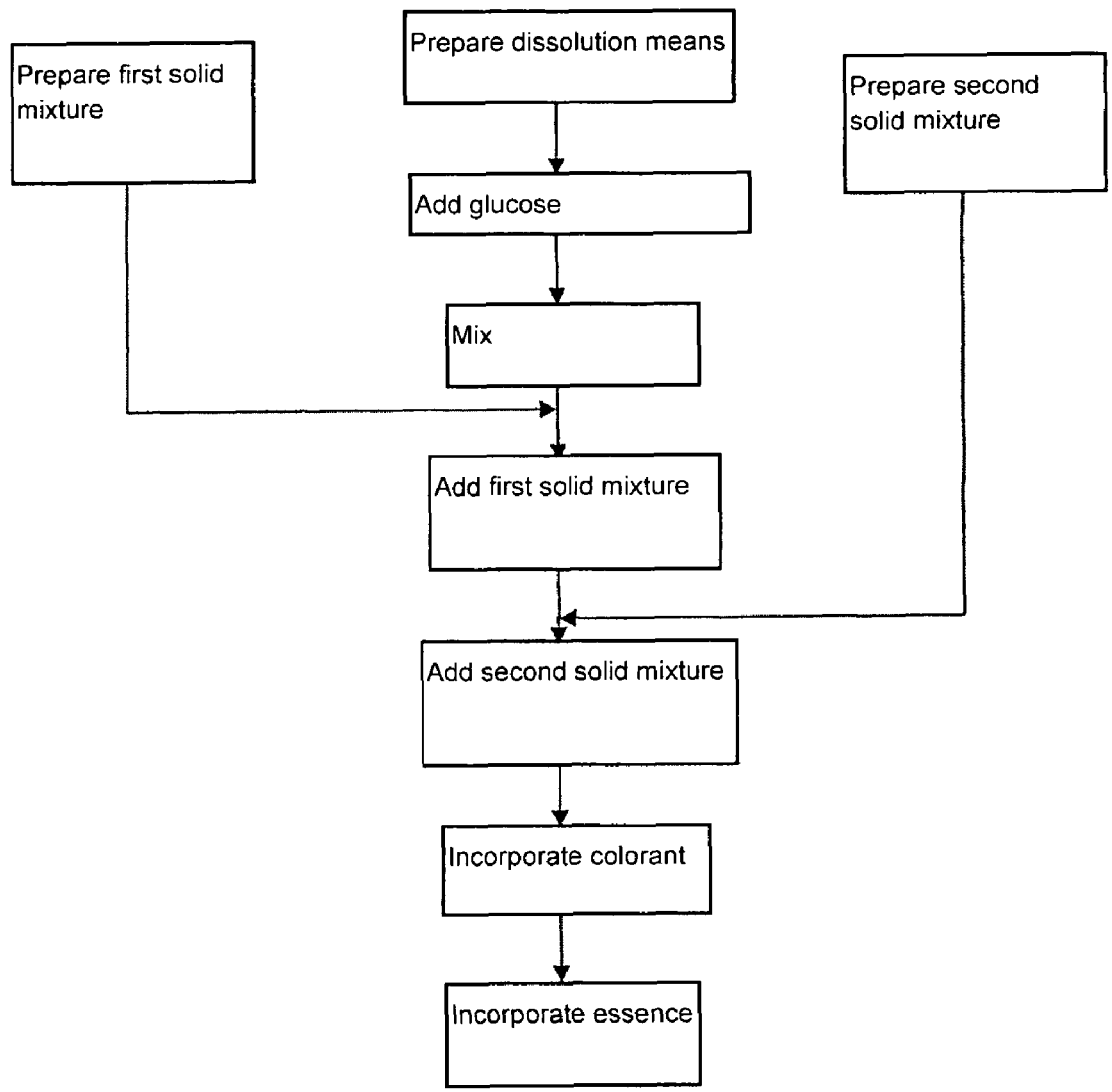

PROTEIN GELATINOUS FOOD AND ITS MANUFACTURE PROCESS

FIELD OF THE INVENTION

The present invention relates to the field of application of the chemical area since it provides a process to obtain a protein gel that due to its novel characteristics is superior to those found in the State of the Art.

SUMMARY OF THE INVENTION

The object of the present invention is to produce a product which allows the combined action of Bifidus and Lactobacilli, probiotics, in viable means which consist of a protein gel with vitamins, to improve human digestion and maximize the use of the ingested food. This product can be considered as a biodigestive.

STATE OF THE ART

The term Probiotic was first used in 1965 by Lilly Stillwell to describe that substance secreted by a microorganism which stimulates the growth of another one, as opposed to the term Antibiotic. In order to perform this function, a microorganism must fulfill Huchetson's postulates: be a regular inhabitant of the intestine, have a short period of reproduction, be able to produce antimicrobial compounds and be stable during production, commercialization and distribution processes until arriving alive to the human intestine that will consume them. Probiotic microorganisms must be capable not only to survive the passage through the digestive apparatus, but also to proliferate in the intestine; that is to say, resisting the gastric juices and growing in the presence of bile in the existing conditions of the intestine or else be consumed in foods which serve as a vehicle which allows them to survive the passage through the digestive apparatus and the exposure to bile; these are Gram-positive bacteria and are fundamentally classified in two classes: Bifidus bacteria and Lactobacillus.

Bifidus and lactobacillus have not yet been included in any type of gel, however, the present innovation generates a gel protein base which also provides the necessary amount of carbohydrates and fats to allow the preservation and maintenance of probiotics until they reach the intestine of whom consumes them. We have managed to obtain a gel product which preserves bifidus and lactobacillus by means of a process strictly signaled. Therefore, the gel and the process for obtaining the same are requested.

U.S. Pat. No. 5,633,030 protects compositions of gelatinous agents which contain xanthan and at least one polysaccharide selected from guar, depolymerised galactomannan and mixtures thereof. The compositions can be used in edible products and methods to produce these and other gelatinous products. The patent protects an edible gel with a melting point between 0 and 45° C., which consists of a composition of gelatinous agents, essentially xanthan and depolymerised guar. Its composition does not allow the viability and maintenance of probiotics since in order to maintain them alive until ingestion, it is necessary to provide a simple carbohydrate and protein which the product protected by said patent lacks of. Moreover, the temperature range requested by this patent prevents the protein from being solubilized with the edible gel which is protected by this patent.

Patent JP204350679 protects an edible gel with a gum base which lacks of proteins and simple carbohydrates with excellent block-formation properties having excellent water retention to allow a low adhesion to the oral cavity when chewed, ignoring all the digestive function in the stomach and the cleavage in the intestine's capillary hairs for absorption by the human body.

Said patents are different from the requested one in that they are not viable means of probiotic sustainability since they do not contain the protein base plus the simple carbohydrates necessary to keep them alive until their life in the intestine begins to decay.

BRIEF DESCRIPTION OF THE DRAWINGS

FIG. 1 is a diagram of the process to obtain a protein gel of the present invention, wherein: a) preparing dissolution means, b) adding glucose, c) mixing, d) preparing first solid mixture, e) adding first solid mixture, f) preparing second solid mixture, g) adding second solid mixture, h) incorporating colorant and i) incorporating essence.

DETAILED DESCRIPTION OF THE INVENTION

The characteristic details of this novel process are clearly shown in the following description and in the accompanying drawing, as well as in an illustration of the former and which follows the same reference signs to indicate the shown figure(s).

A protein gel containing 1.976-2.964 lts of water, 703.375-951.625 g of cane sugar, 1015.83-1422.167 g of glucose in a liquid state, 195.5-264.5 g of protein element, 41.85-51.15 g of xanthan gum, 112-168 g of linseed flax fiber, 30-35 g of vitamins, 1 g of citric seed extract, 44.62-60.37 g of citric acid, 9-11 g of malic acid, 4.875-5.851 g of bifidus, 1.625-1.950 g of lactobacillus, 3.325-3.675 ml of colorant and 9-10 g of essence is presented.

The protein element is a mixture of 30% glycerin, 14% proline, 8% hydroxyproline, 45% other amino acids, 1.2% water and 1.8% mineral salts. The last two must not contain fats or carbohydrates.

The linseed flax fiber comprises 40.9% polysaturated fats which contain alphalinoleic acid, 20% vegetal protein, 28% vegetal fiber, 7.7% humidity and 3.4% mineral residue.

A protein gel is also presented, consisting of the following steps:

1. Preparing dissolution means, for which purified water needs to be heated to a temperature between 55 and 85° C. and agitated at 284.75-385.25 rpm; adding the cane sugar and 1 g of citric seed extract to be mixed for at least one minute. The citric seed extract functions as a natural additive. The dissolution of sugar in water is difficult at a lower temperature. This mixture is performed for 8-15 minutes.

2. Immediately increasing the speed of the previous mixture to 170-700 rpm in order to add the glucose in a liquid state; this must be performed at a temperature between 60 and 90° C.

3. Mixing the solution of the second step for 3-5 minutes at a speed of 250 to 700 rpm to obtain sweet, lumpless syrup with no non-solubilized grains. The temperature is maintained in a range between 55-67° C.

4. Immediately adding a first solid mixture, consisting of:

Mixing 195.5-264.5 g of protein element, 41.85-51.15 g of xanthan gum, 112-168 g of linseed flax fiber and 30-35 g of vitamins. All these components are placed in a dry, humidity-free container with a lid at a temperature no lower than 6° C. or higher than 30° C. The container is perfectly closed and mixed for between 2.5 and 6 minutes at a speed of 48-72 rpm. To achieve this mixture it is important to perform it at a relative humidity no higher than 60% since xanthan gum is highly hygroscopic and would absorb water, generating lumps and adhering to the surface of the mixing container, preventing a solid homogeneous mixture from forming. This primary solid mixture must have a pH between 5 and 8, thus allowing a compact and concise emulsification when getting in contact with the liquid syrup to which it will be incorporated. The emulsification is caused by the action between the protein base and the xanthan gum in means with a pH between 5 and 8, which allows no-dissociation and precipitation of the protein base in the remaining gel during the shelf life of the product, which differentiates it from any other edible gel product known by the human being.

In this way, syrup is obtained with a temperature that must be in the range of 46-85° C., since the gel base will not be able to be emulsified at a lower temperature and at a temperature higher than 90° C. the xanthan gum molecules and protein would break. It is added at a speed between 68 and 102 rpm and once the addition has been finished, the speed is increased between 170 and 700 rpm.

Up to this step, the integrity of the protein molecule is preserved, since due to the range of temperature, not enough carbon dioxide is generated and the molecule does not break.

5. Adding a second mixture, after 8.5 to 11.5 minutes of having added the first solid mixture to the syrup. Said second mixture consists of:

Mixing 44.62-60.37 g of citric acid, 9-11 g of malic acid, 4.875-5.850 g of bifidus and 1.625-1.950 g of lactobacilli. All the ingredients are placed in a dry container with a relative humidity no higher than 50%, preferably 30%, not transparent or that prevents the passage of light to avoid the premature reactivation of probiotics; at a temperature no lower than 5° C. and no higher than 35° C., which allows easy handling of the previously required relative humidity. The container is perfectly closed and mixed for 2-5 minutes at no less than 30 rpm and up to 65 rpm. The citric and malic acids will generate a pre-activation of the lyophilized probiotics.

It is vital for the digestive function that the combined concentration of bifidus and lactobacilli is at least of $150 \times 10^9$ CFU (Colony Formation Units) per gram. This will ensure that in portions of 15 g of the finished product exist $2 \times 10^9$ CFU. Probiotics added are lyophilized. However, the proportion can be maintained in a relation of 2:1 up to 3:1 of bifidus and lactobacilli, respectively.

The temperature must be between 40 and 50° C. This mixture already contains probiotics pre-activated by the action of the citric and malic acids. They will be completely activated when getting in contact with humidity of the previously obtained mixture and will support their life by means of proteins and carbohydrates until the product is consumed by the human organism.

The initial addition of this mixture is performed at a speed of 68 and 102 rpm and once the addition has been finished, the speed is increased to a range between 150 and 700 rpm for 7 minutes at least.

6. Incorporating colorant, consisting of a mixture of fine powder pigment with water; the colorant is soluble in the hot, odorless, translucent gel of desired color, with no heavy metals like mercury, lead and arsenic, aniline in less than 8 parts per million, boiling point at 100° C. and specific weight 1. To make the incorporation of colorant easier it is important to maintain the mixture between 40 and 65° C. Adding the colorant by injection, allowing it to incorporate to the mixture for 1 to 3 minutes. Speed is maintained between 150 and 700 rpm.

7. Finally incorporating the liquid, colorless essence of translucent appearance and desired flavor, specific gravity at 20° C. between 0.9659-1.0100 and refraction index at 20° C. of 1.400 to 1.4450, which has to be of low aqueous activity at elevated osmotic pressure and at composition of the essence for which no microbial growth of any type is possible, thus avoiding any undesired contamination in the product. This is incorporated in a minute in a speed range between 150 and 700 rpm, continuing with the agitation at least for another two minutes until achieving total homogenization of all the ingredients in the final mixture.

Once the process of the primary mixture has started, it should not be stopped since it would cause precipitations of solids, premature solidification and deficient dispersion of the probiotics.

Maintaining the temperature of the mixture below 50° C. ensures there are no significant decreases in the probiotics, since they are sensitive to temperatures higher than 65° C.

The established proportion of bifidus and lactobacilli generates a combined action where the lactobacilli will condition the digestive atmosphere to facilitate the bifidus job and thus achieve optimal absorption of proteins and nutrients giving benefits to the human body, which are: reforestation of the intestinal flora, improvement of the digestive function and activation of the immunological system with continuous and regular ingestion.

The obtained product is equivalent to approximately 5,000 g.

The invention claimed is:

1. A process for the manufacture of a viable bifidus and lactobacilli protein gelatinous food comprising the following steps:
    a) heating 1.976-2.964 lts of purified water at a temperature between 55 and 85° C. while agitating at 284.75-385.25 rpm, and adding 703.375-951.625 g of cane sugar and 1 g of citric seed extract and mixing for 8-15 minutes;
    b) immediately increasing the agitation speed of the previous mixture to 170-700 rpm and adding glucose in a liquid state at a temperature between 60 and 90° C.;
    c) mixing the solution of step b) for 3-5 minutes at a speed of 250 to 700 rpm to obtain a sweet syrup with no lumps or non-solubilized grains maintaining the temperature in a range between 55 and 67° C.;
    d) immediately adding to the mixture of a)-c) a first solid mixture while maintaining 60% humidity, a pH between 5 and 8 and at a temperature between 46 and 85° C., consisting of:
        i. 195.5-264.5 g of protein element, 41.85-51.15 g of xanthan gum, 112-168 g of linseed flax fiber and 30-35 g of vitamins;
    e) adding a second mixture, 8.5 to 11.5 minutes after the prior step, at a speed between 68 and 102 rpm, consisting of:
        i. 44.625-60.375 g of citric acid, 9-11 g of malic acid, 4.875-5.850 g of viable bifidus and 1.625-1.950 g of viable lactobacilli;
    f) incorporating by injection over a time of between 1 and 3 minutes a colorant while maintaining the mixture temperature between 40 and 65° C. and a mixing speed between 150 and 700 rpm;
    wherein said colorant consists of a mixture of fine powder pigment with water;
    wherein said colorant is soluble in hot gel, odorless and translucent; and
    wherein said colorant contains no heavy metals, aniline in less than 8 parts per million, has a boiling point of a temperature of 100° C. and a specific weight of 1;
    g) incorporating, over 1 minute, at a speed range between 150 and 700 rpm, a translucent, colorless, liquid essence having a desired flavor, a specific gravity at 20° C. between 0.9659-1.0100 and refraction index at 20° C. of 1.400-1.4450, and continuing agitation, at least, for another 2 minutes until achieving the total homogenization of all the ingredients in the final mixture;
    wherein said essence has a low aqueous activity at an elevated osmotic pressure and is unable to support and microbial growth; and
    wherein the bifidus and the lactobacilli are viable in the protein gelatinous food.

2. A process for the manufacture of the protein gelatinous food of claim 1, characterized in that the second solid mixture must contain a bifidus and lactobacilli concentration in a relation of 2:1 up to 3:1, respectively, of at least $150 \times 10^9$ CFU per gram.

3. A protein gelatinous food composed of 1.976-2.964 lts of water, 703.375-951.625 g of cane sugar, 1,015.83-1,422.167 g of liquid glucose, 195.5-264.5 g of protein element, 41.85-51.15 g of xanthan gum, 112-168 g of linseed flax fiber, 30-35 g of vitamins, 1 g of citric seed extract, 44.625-60.375 g of citric acid, 9-11 g of malic acid, 4.875-5.85 g of bifidus, 1.625-1.950 g of lactobacilli, 3.325-3.675 ml of colorant and 9-10 g of essence.

* * * * *